US008256088B2

(12) United States Patent
James et al.

(10) Patent No.: US 8,256,088 B2
(45) Date of Patent: Sep. 4, 2012

(54) JOINING MECHANISM WITH STEM TENSION AND INTERLOCKED COMPRESSION RING

(75) Inventors: Allister W. James, Chuluota, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 471 days.

(21) Appl. No.: 12/545,930

(22) Filed: Aug. 24, 2009

(65) Prior Publication Data

US 2011/0041313 A1 Feb. 24, 2011

(51) Int. Cl.
*B23P 11/02* (2006.01)
*B23P 15/04* (2006.01)
*F03B 11/02* (2006.01)

(52) U.S. Cl. .................... 29/447; 29/889.22; 29/889.21; 29/446; 415/209.4; 415/210.1

(58) Field of Classification Search ................ 29/889.2, 29/889.21, 889.22, 446, 447; 415/200, 209.4, 415/210.1
See application file for complete search history.

(56) References Cited

U.S. PATENT DOCUMENTS 2,477,375 A 7/1949 Jablonsky
3,137,602 A 6/1964 Lincoln
3,854,189 A 12/1974 Ezis et al.
3,910,716 A 10/1975 Roughgarden et al.
4,330,568 A 5/1982 Boehm et al.
4,396,349 A 8/1983 Hueber
4,501,053 A 2/1985 Craig et al.
4,519,745 A 5/1985 Rosman et al.
4,530,884 A 7/1985 Erickson et al.
4,563,125 A 1/1986 Boudigues et al.
4,563,128 A * 1/1986 Rossmann ...................... 416/92
4,629,397 A 12/1986 Schweitzer
4,639,189 A 1/1987 Rosman
4,643,636 A 2/1987 Libertini et al.
4,645,421 A 2/1987 Huether
4,768,924 A 9/1988 Carrier et al.
4,790,721 A 12/1988 Morris et al.
4,838,031 A 6/1989 Cramer
4,907,946 A 3/1990 Ciokajlo et al.
5,027,604 A 7/1991 Krueger
5,062,767 A 11/1991 Worley et al.
5,226,789 A 7/1993 Donges
5,306,554 A 4/1994 Harrison et al.
5,314,309 A 5/1994 Blakeley et al.
5,328,331 A 7/1994 Bunker et al.
5,358,379 A 10/1994 Pepperman et al.
5,375,978 A 12/1994 Evans et al.
5,382,453 A 1/1995 Mason
5,439,627 A 8/1995 De Jager
5,484,258 A 1/1996 Isburgh et al.
(Continued)

*Primary Examiner* — Essama Omgba

(57) ABSTRACT

A stem (34) extends from a second part (30) through a hole (28) in a first part (22). A groove (38) around the stem provides a non-threaded contact surface (42) for a ring element (44) around the stem. The ring element exerts an inward force against the non-threaded contact surface at an angle that creates axial tension (T) in the stem, pulling the second part against the first part. The ring element is formed of a material that shrinks relative to the stem by sintering. The ring element may include a split collet (44C) that fits partly into the groove, and a compression ring (44E) around the collet. The non-threaded contact surface and a mating distal surface (48) of the ring element may have conic geometries (64). After shrinkage, the ring element is locked onto the stem.

14 Claims, 5 Drawing Sheets

U.S. PATENT DOCUMENTS

| | | | |
|---|---|---|---|
| 5,493,855 | A | 2/1996 | Walters et al. |
| 5,494,402 | A | 2/1996 | Glezer et al. |
| 5,584,652 | A | 12/1996 | Shaffer et al. |
| 5,605,046 | A | 2/1997 | Liang |
| 5,616,001 | A | 4/1997 | Boyd |
| 5,630,700 | A | 5/1997 | Olsen et al. |
| 5,640,767 | A | 6/1997 | Jackson et al. |
| 5,720,597 | A | 2/1998 | Wang et al. |
| 5,791,879 | A | 8/1998 | Fitzgerald et al. |
| 5,797,725 | A | 8/1998 | Rhodes |
| 5,820,337 | A | 10/1998 | Jackson et al. |
| 5,881,775 | A | 3/1999 | Owen et al. |
| 5,887,332 | A | 3/1999 | Champenois et al. |
| 6,000,906 | A | 12/1999 | Draskovich |
| 6,164,903 | A | 12/2000 | Kouris |
| 6,197,424 | B1 | 3/2001 | Morrison et al. |
| 6,200,092 | B1 | 3/2001 | Koschier |
| 6,241,469 | B1 | 6/2001 | Beeck et al. |
| 6,325,593 | B1 | 12/2001 | Darkins, Jr. et al. |
| 6,368,663 | B1 | 4/2002 | Nakamura et al. |
| 6,451,416 | B1 | 9/2002 | Holowczak et al. |
| 6,514,046 | B1 | 2/2003 | Morrison et al. |
| 6,617,013 | B2 | 9/2003 | Morrison et al. |
| 6,648,597 | B1 | 11/2003 | Widrig et al. |
| 6,807,721 | B2 * | 10/2004 | Choo et al. ................. 29/603.03 |
| 7,093,359 | B2 | 8/2006 | Morrison et al. |
| 7,278,150 | B2 * | 10/2007 | Hisamoto ..................... 720/706 |
| 7,380,798 | B2 * | 6/2008 | Wolters ......................... 279/2.17 |
| 7,413,700 | B2 | 8/2008 | Merrill et al. |
| 7,563,071 | B2 * | 7/2009 | Campbell et al. .......... 415/173.1 |
| 7,926,162 | B2 * | 4/2011 | Wolters ............................ 29/559 |
| 8,061,977 | B2 * | 11/2011 | Keller et al. ............... 415/173.1 |
| 2003/0207155 | A1 | 11/2003 | Morrison et al. |
| 2003/0223861 | A1 | 12/2003 | Morrison et al. |
| 2005/0254942 | A1 | 11/2005 | Morrison et al. |
| 2008/0104820 | A1 * | 5/2008 | Wolters ............................ 29/446 |
| 2008/0107521 | A1 | 5/2008 | Morrison et al. |
| 2008/0284059 | A1 | 11/2008 | Merrill et al. |

* cited by examiner

JOINING MECHANISM WITH STEM TENSION AND INTERLOCKED COMPRESSION RING

STATEMENT REGARDING FEDERALLY SPONSORED DEVELOPMENT

Development for this invention was supported in part by Contract No. DE-FC26-05NT42644 regarding Advanced Hydrogen Turbine Development, awarded by the United States Department of Energy. Accordingly, the United States Government may have certain rights in this invention.

FIELD OF THE INVENTION

The invention relates to joining mechanisms, and particularly to mechanisms for joining turbine vane airfoils to platforms.

BACKGROUND OF THE INVENTION

Turbine engines have one or more circular arrays of stationary vanes that direct a working gas against corresponding circular arrays of rotating blades. A vane is an airfoil attached at each end to a platform member. This attachment must be strong enough to support cantilever and rotational forces on the vane exerted by the working gas. One assembly method is to cast one or more vanes integrally between inner and outer platform members to form what is called a vane segment or nozzle segment. However, such an integral assembly cannot be disassembled for service. Reversible joining methods are preferred for disassembly and replacement of sub-component pieces for repair or replacement. Threaded bolts and nuts can be used to attach vanes to platforms and allow disassembly. However, threaded fasteners can loosen during operational vibrations. Pin-type fasteners can be used, but they do not draw the vane against the platform, which is desirable to resist shifting and to prevent vibration. Pins and other mechanical fasteners may require precisely machined mating surfaces, yet they still may vibrate, shift, or loosen during service.

U.S. Patent Application Publication US 2005/0254942 A1 of the present assignee teaches a joining method for assembling components in which a first ceramic matrix composite (CMC) component is fabricated and fired to a selected first cured state. A second CMC element is fabricated and left in a green state, or is fired to a second partially cured state less complete than that of the first cured state. The two CMC elements are joined in a mating interface, and are then fired together, resulting in differential shrinkage that compresses the outer joining portion on the inner joining portion, locking them together. This mechanism and method is useful for securing the end of a vane in place relative to a platform element after the two pieces are urged together by another mechanism.

BRIEF DESCRIPTION OF THE DRAWINGS

The invention is explained in the following description in view of the drawings that show.

DETAILED DESCRIPTION OF THE INVENTION

Figure 1:
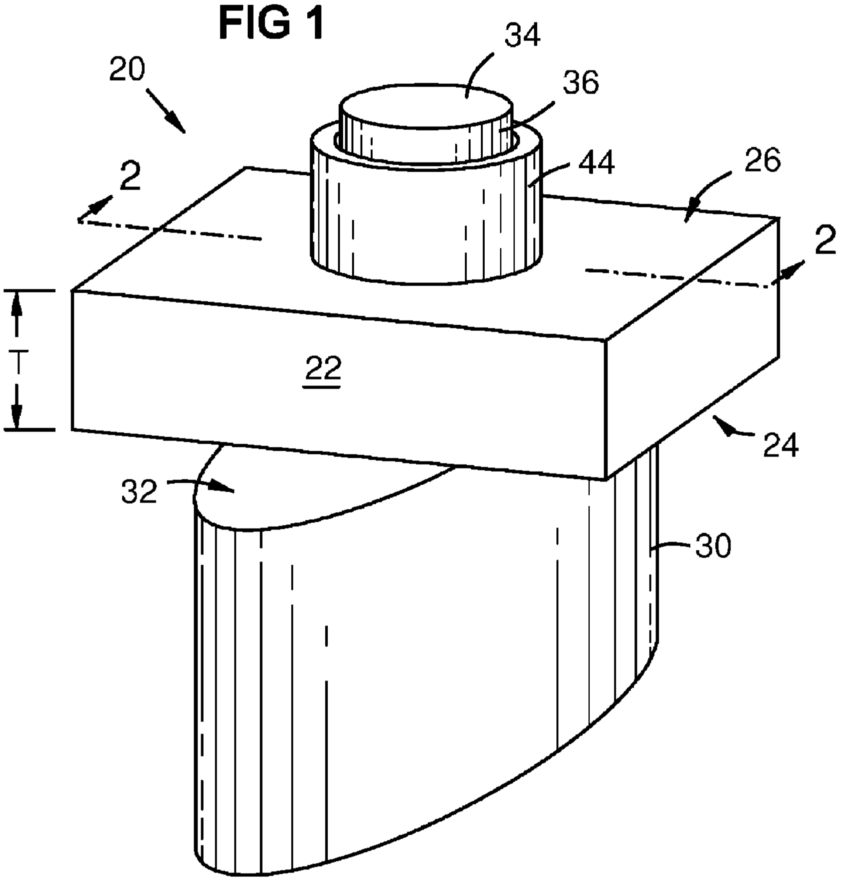
FIG. 1 is a perspective view of two parts joined according to the invention.
Figure 2:
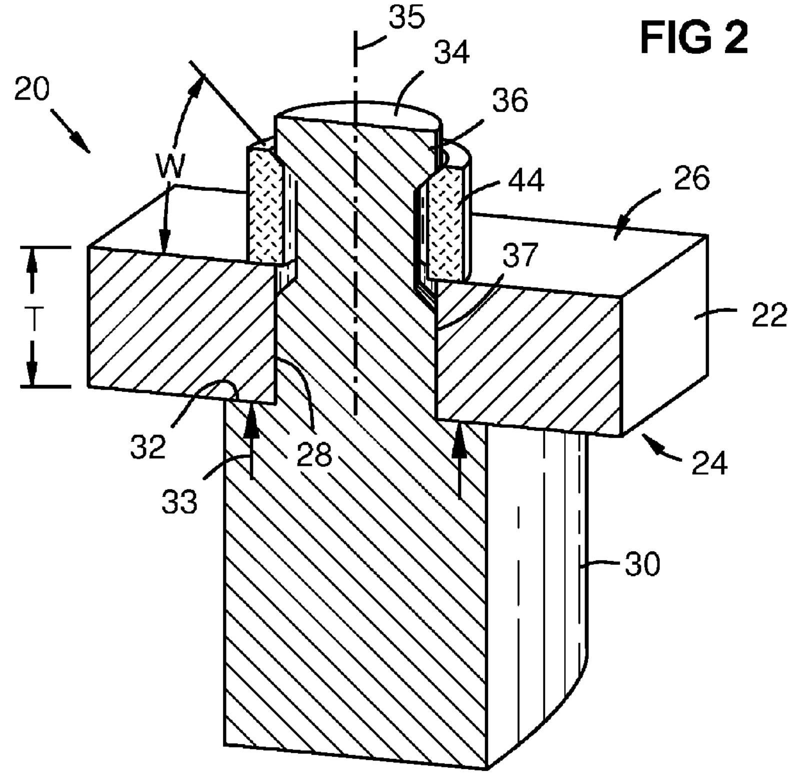
FIG. 2 is a perspective sectional view taken along line 2-2 of FIG. 1.

FIGS. 1-4 illustrate one embodiment of a mechanism 20 for joining a first part 22 to a second part 30. The first part 22 has a thickness T, a first side 24, a second side 26, and a hole 28 therebetween. The second part 30 has a shoulder 32. A stem 34 extends from the shoulder along an axis 35, passing through the hole 28. The shoulder 32 abuts the first side 24 of the first part 22. A distal end 36 of the stem 34 extends beyond the second side 26 of the first part 22. A ring element 44 is disposed around the stem 34, and has a proximal end 46 that abuts the second side 26 of the first part 22.

Figure 3:
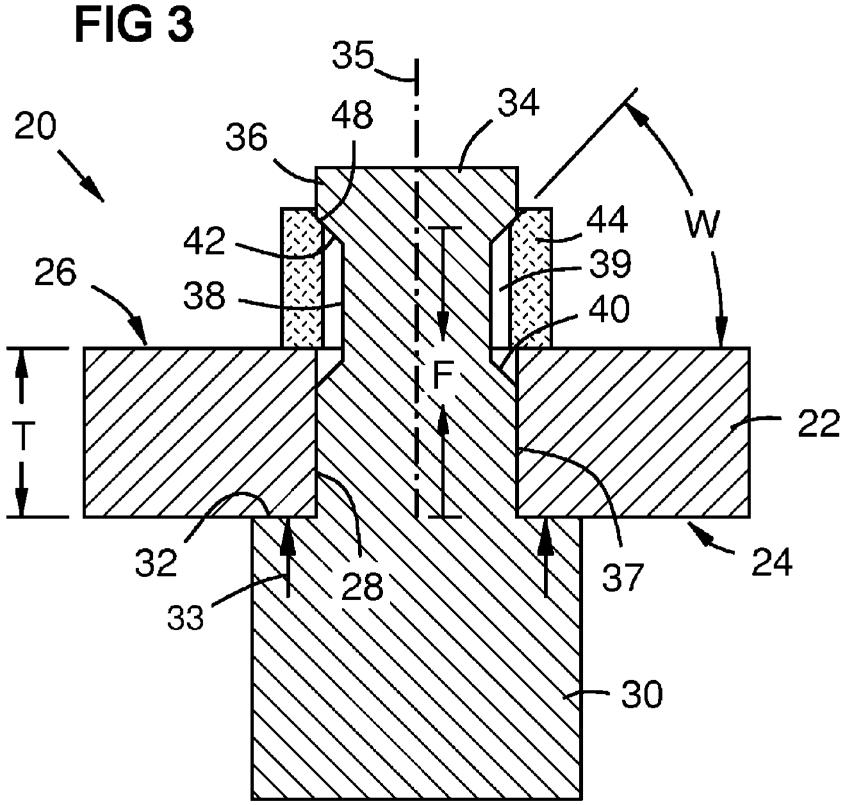
FIG. 3 is a front sectional view of the embodiment of FIG. 1.

As shown in FIG. 3, the ring element 44 has a distal surface 48 that engages a non-threaded contact surface 42 on the stem 34 at a contact angle W relative to a plane of second side 26 that converts a radially inward force exerted by the ring element 44 into an axial tensile force F in the stem that draws (arrows 33) the shoulder 32 of the second part 30 against first side 24 of the first part, creating a tight assembly. The prior art attachment device of U.S. Patent Application Publication US 2005/0254942 A1 does not provide this active application of the radial drawing force 33. Herein, "radially" is relative to the stem axis 35. A gap 39 is shown between the bottom of the groove 38 and the ring element 44. This gap allows the ring element 44 to shrink inward as later described, wedging the ring element against the non-threaded contact surface 42. This gap is present at the start of shrinkage, and may or may not be fully closed by the shrinkage. The groove 38 may be made shallow enough to stop the inward contraction of the ring element at a desired stage, in which case the gap 39 is closed after shrinkage.

The "non-threaded" aspect of the contact surface 42 means that it is not defined by helical threads. It may instead be defined by conic geometries as later described. This permanently interlocks ring element with the stem, so the ring element cannot loosen like a threaded nut. However, unlike an integral casting, the parts 22, 30 can be disengaged for repair or replacement by cutting the disposable and replaceable ring element. This provides advantages of both permanent and releasable joining mechanisms.

Figure 4:
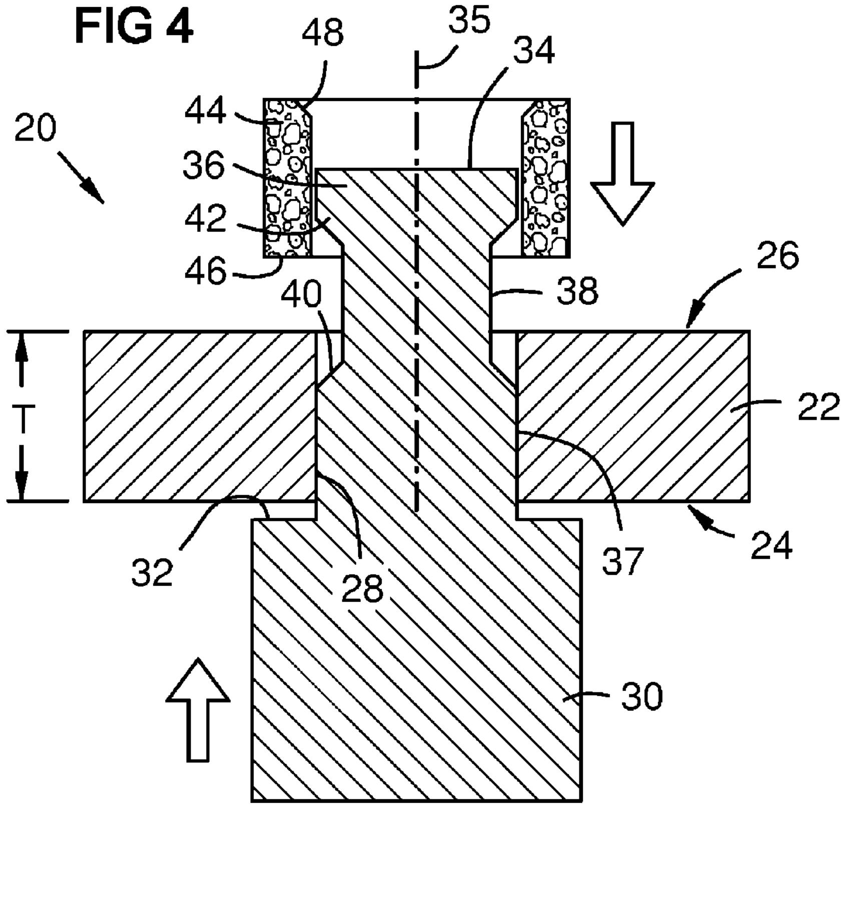
FIG. 4 illustrates an assembly stage of the embodiment of FIG. 1.

As shown in FIG. 4, the ring element 44 may be formed of a sinterable material, such as a powdered metal, that is processed to a first rigid state such as a green or partly fired compacted metal powder. In this first rigid state, the ring element may have an inner diameter that closely slides over the stem 34. After placement over the stem, the ring element 44 is sintered to shrink it radially inward against the non-threaded contact surface 42. Tensile force F in the stem 34 is formed by the contact angle W between the non-threaded contact surface 42 on the stem and the second surface 26 of the first part 22, as measured in a plane of the axis 35, for example in the section plane of FIGS. 2-4. The contact angle W can be considered a wedge angle, which may be between 5-85 degrees, especially between 10 and 80 degrees.

The non-threaded contact surface 42 may be formed by a groove 38 in a lateral surface 37 of the stem 34. The groove may have a proximal surface 40 that does not contact the ring element 44 during at least a first portion of the shrinkage process, so that the stem 34 can be drawn upward to create tension F. The distal surface 48 of the ring element may match the angle of the non-threaded contact surface 42 within 5 degrees, and especially within 1 degree therebetween in a plane of the axis 35, in order to distribute contact stress.

Figure 5:
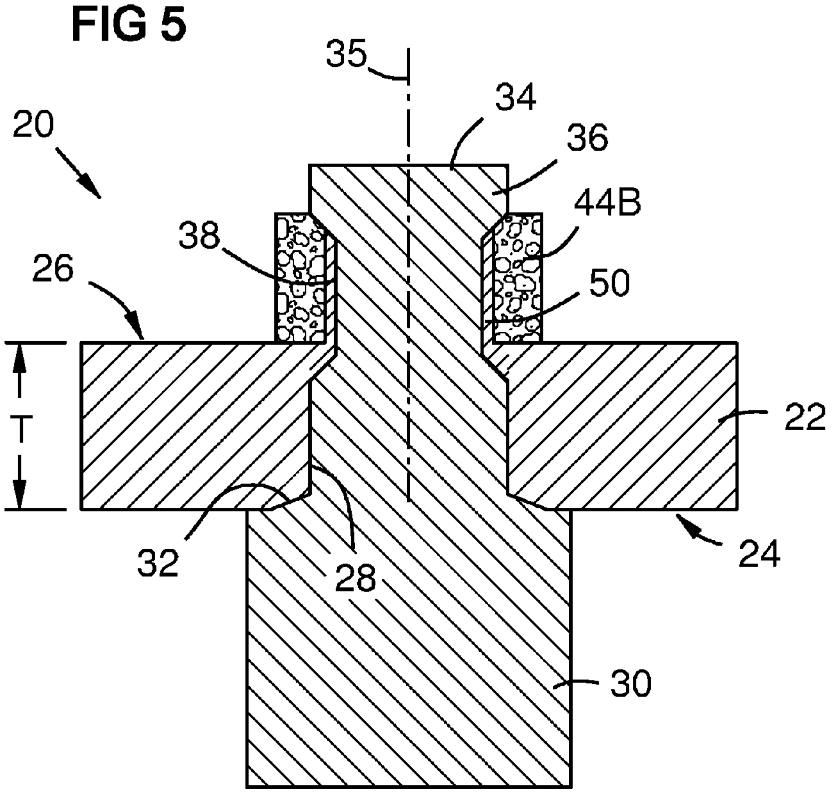
FIG. 5 illustrates a method of forming the ring element in place.

FIG. 5 illustrates a ring element 44B that is formed in place by disposing a sinterable material in the groove 38, thus using the groove 38 as a form for the ring element 44B. A bottom portion of the groove may be filled with a layer of a fugitive material 50 as shown to provide a gap 39 as described for FIG. 2, allowing inward shrinkage. During sintering of the ring element 44B, the fugitive material 50 is removed, allowing inward shrinkage of the ring element 44B. In any embodiment, the shoulder 32 may be an angled or general conic surface, as shown in FIG. 5, that provides lateral support and centering of the stem in the hole as the joint tightens.

Figure 6:
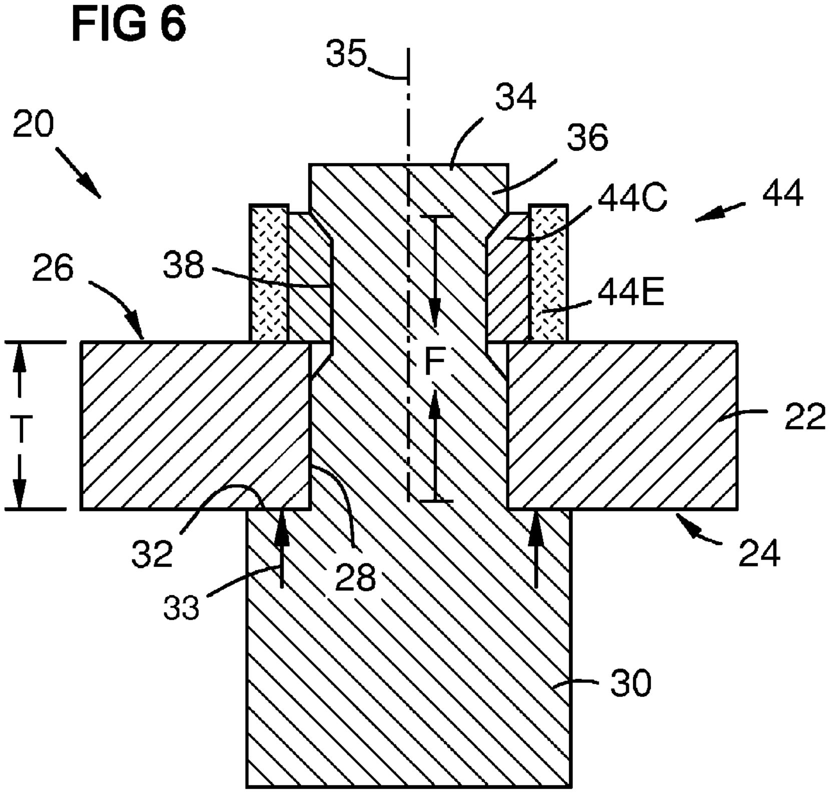
FIG. 6 is a front sectional view of a split collet embodiment of the ring element.
Figure 7:
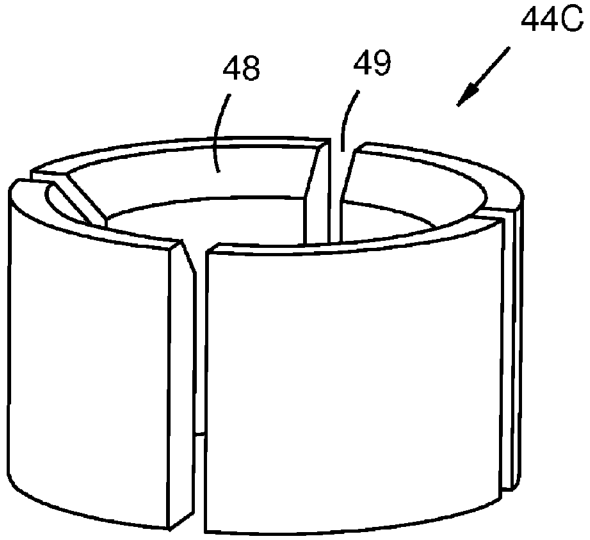
FIG. 7 is a perspective view of a split collet.

FIG. 6 illustrates a two-part ring element 44 having a split collet 44C surrounded by a compression ring 44E. The split collet is further illustrated in FIG. 7 to show its segmentation 49. The collet can be placed around and partly within the groove 38. Then the compression ring 44E can be slipped over the collet and sintered to compress the collet. In this embodiment, the distal surface 48 of the ring element is on the collet. Using a collet allows for closer initial fits, and can accommodate larger tolerances and gaps. The compression ring 44E can be cut away for disassembly without damaging the stem 34. The collet also prevents bonding of the compression ring 44E to the stem 34 during sintering.

Figure 8:
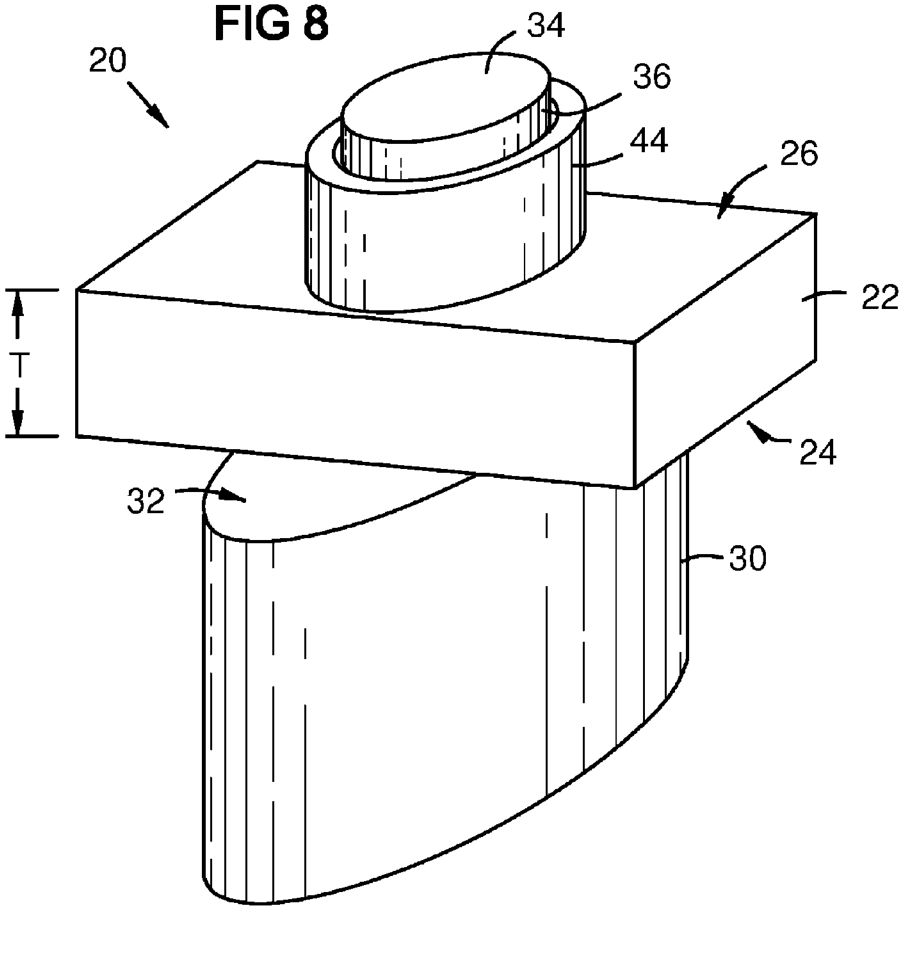
FIG. 8 is a perspective view of an elliptical embodiment of the invention.

FIG. 8 shows an elliptical stem geometry that may be used to prevent rotation of the stem 34 within the hole 28. In general, the stem 34 and the hole 28 may have matching non-circular cross sections so that the stem cannot rotate within the hole.

Figure 9:
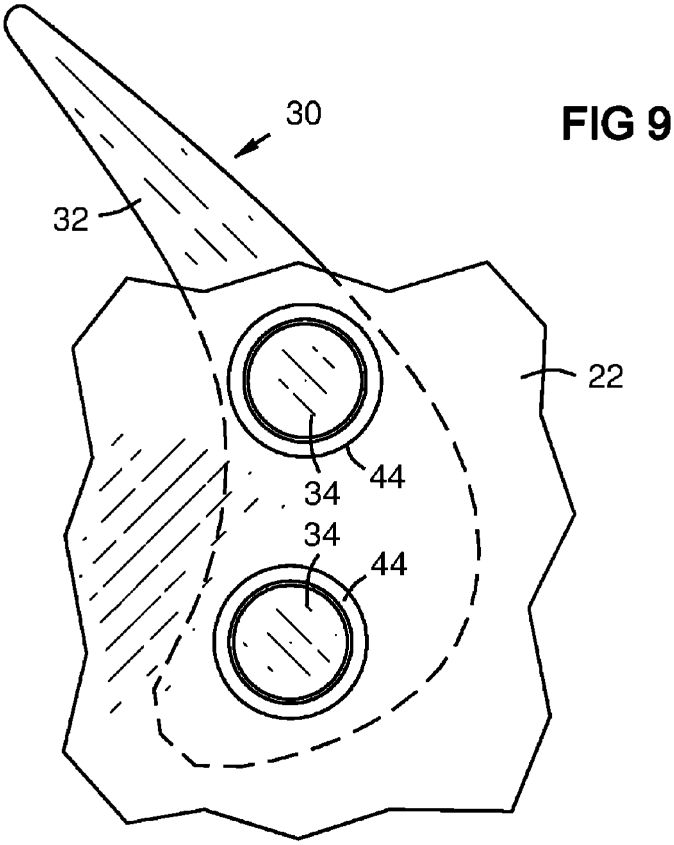
FIG. 9 is a top view of the invention applied to an airfoil mounted to a platform.

FIG. 9 shows an application of the invention in which the first part 22 is an airfoil platform, and the second part 30 is an airfoil attached to the platform. The airfoil may be a stationary vane for a turbine. Two stems 34 are shown, which prevents rotation of the airfoil that could occur about a single cylindrical stem attachment. Alternately a stem with a non-circular cross-section can be used as in FIG. 8.

Figure 10:
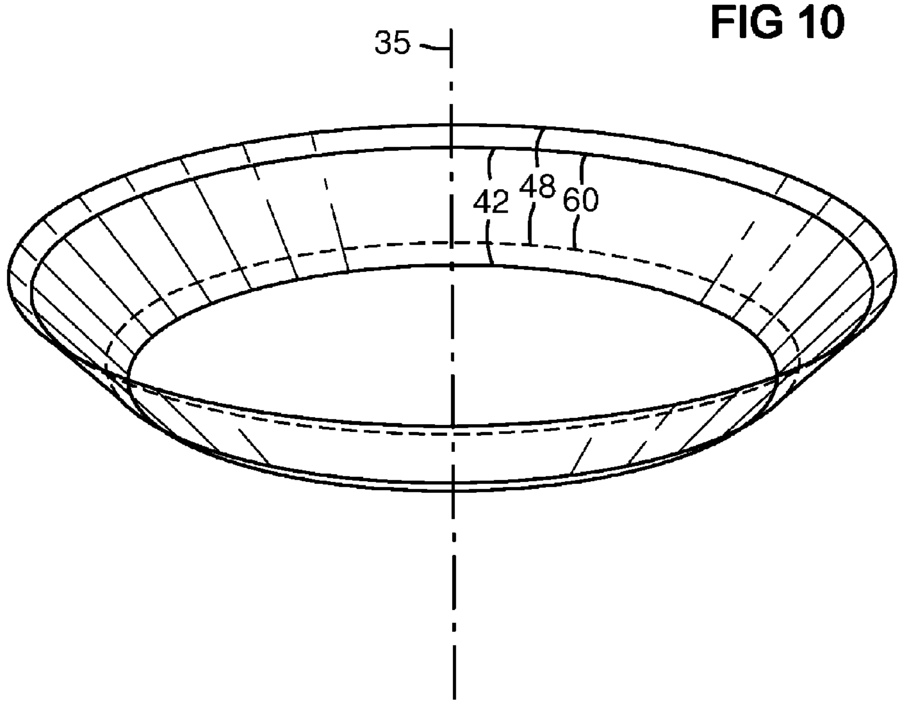
FIG. 10 shows a truncated cone geometry of respective contact surfaces on the stem and ring elements.

FIG. 10 shows a truncated circular conic geometry of both the non-threaded contact surface 42 on the stem, and of a matching distal surface 48 of the ring element. Other conic geometries may be used, such as elliptical, as in the embodiment of FIG. 8. A generalized conic surface geometry may be used. The two surfaces 42 and 48 may match each other within 5 degrees in a plane of the axis 35 in an overlap area of contact 60, and especially within 1 degree.

Herein, "distal" and "proximal" are relative to the shoulder 32 from which the stem extends, for example an end of an airfoil. Herein, "lateral surface envelope" means the side surface geometry of the stem 34 not including the groove 38, and defines the lateral limits of the stem, which may be cylindrical or non-cylindrical. A "generalized cone" is a surface created by the set of lines passing through a vertex and every point on a base perimeter, which may be any closed convex curve, including a circle, an ellipse, and a polygon. A closed convex curve is a closed curve or closed series of line segments that intersects a straight line at not more than two points. An elliptical cone has an elliptical base perimeter. A circular cone has a circular base perimeter.

The joining mechanism 20 may be produced by forming the second part 30 and the stem 34 of a first sinterable material such as a metal powder; sintering the second part and the stem; forming the ring element 44 of either the first sinterable material or a second sinterable material; processing the ring element 44 to a first rigid state such as a partly sintered or partially compacted metal powder; disposing the ring element around the sintered stem; and sintering the ring element to shrink it relative to the stem.

The size of the ring element 44 can be adjusted to exert the required amount of force. Additionally, an operational coefficient of thermal expansion (CTE) mismatch can be used to apply additional force by selecting appropriate different materials for the ring element and the stem. The ring element may be formed of a material that sinters at temperatures below the insipient melting temperature of the first and second parts 22, 30. For example, the first and second parts 22, 30 may be made of a alloys such as Ni-based superalloys (for example IN939, CM247LC, CMSX-4), or Co-based superalloys, or FeCrAlY materials, or Fe-based Oxide Dispersion Strengthened alloys (for example PM-2000), and the ring element 44 may be made of relatively sinterable materials such as pure nickel, 17-4 stainless steel, or higher melting temperature alloys having additives such as boron to suppress the melting or sintering temperature.

Full densification of the ring element 44 is not essential for joint strength, since the size of the ring can be adjusted. Thus, lower sintering temperatures may be possible. For typical sintered metal compacts, shrinkages of 15-25% are common, depending on powder size & distribution, green density, and sintering temperature. Such shrinkage amounts can be used effectively to close tolerance gaps and affect preloading 33 of the joint.

The present joining method produces a tight joint that prevents shifting and vibration. The joint elements do not require close machine tolerances, since the ring element 44 shrinks to fit the stem 34, thus removing initial clearance. This joint cannot loosen as with threaded joints, but can be disassembled, unlike integral casting and other permanent joining mechanisms.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A mechanism for joining first and second parts comprising:

a first part with first and second sides and a hole passing therebetween;

a second part comprising a shoulder with a stem extending therefrom along an axis, the stem passing through the hole, with the shoulder abutting the first side of the first part and a distal part of the stem extending beyond the second side of the first part;

a ring element disposed around the distal part of the stem;

wherein the ring element abuts the second side of the first part, and engages a non-threaded contact surface on the stem at a contact angle that converts a radially inward force exerted by the ring element into an axial tensile force in the stem that draws the shoulder of the second part against the first side of the first part;

wherein the non-threaded contact surface of the stem is a side surface of a groove in a lateral surface of the stem and the non-threaded contact surface comprises a surface angle of 10-80 degrees relative to a second surface of the first part in a plane of the stem axis.

2. The joining apparatus of claim 1, wherein the distal surface of the ring element comprises a surface area that contacts the non-threaded contact surface at an angle of less than 5 degrees therebetween in the plane of the stem axis.

3. The joining apparatus of claim 2, wherein the ring element comprises:
- a split collet disposed at least partly within the groove, wherein the distal surface of the ring element is formed on a distal end of the split collet; and
- a compression ring surrounding and compressing the split collet radially inward.

4. The mechanism of claim 1, wherein:
- the groove has a distal side surface comprising a first truncated general conic surface that forms the non-threaded contact surface of the stem; and
- the distal surface of the ring element comprises a second truncated general conic surface, wherein the first and second truncated general conic surfaces match each other within 5 degrees therebetween in an area of contact therebetween in a plane of the axis.

5. The mechanism of claim 4, wherein the stem has a cylindrical side surface envelope and the first and second truncated general conic surfaces are circular conic surfaces.

6. The mechanism of claim 4, wherein the stem has an elliptic cylindrical side surface envelope and the first and second truncated general conic surfaces are elliptical conic surfaces.

7. The mechanism of claim 1, wherein the stem and the hole have matching non-circular cross sections, wherein the stem cannot rotate in the hole.

8. The mechanism of claim 1, wherein the shoulder comprises a general conic surface centered on the axis that provides lateral support and centering of the stem in the hole.

9. A mechanism for joining first and second parts comprising:
- a first part with first and second sides and a hole passing therebetween;
- a second part comprising a shoulder with a stem extending therefrom along an axis, the stem passing through the hole, with the shoulder abutting the first side of the first part and a distal part of the stem extending beyond the second side of the first part;
- a ring element disposed around the distal part of the stem;
- wherein the ring element abuts the second side of the first part, and engages a non-threaded contact surface on the stem at a contact angle that converts a radially inward force exerted by the ring element into an axial tensile force in the stem that draws the shoulder of the second part against the first side of the first part;
- wherein the ring element comprises a proximal end that abuts the second side of the first part and a distal surface that exerts the radially inward force against the non-threaded contact surface of the stem at an angle of contact that converts the radially inward force into the axial tensile force in the stem;
- wherein the ring element comprises a compression ring with hoop tension formed by sintering shrinkage of the compression ring relative to the stem, and the distal surface of the ring element is formed on a distal end of the compression ring.

10. A mechanism for joining a turbine airfoil to a platform comprising:
- a platform comprising a hole passing through a thickness thereof from a first side to a second side thereof;
- a turbine airfoil comprising an end with a stem extending therefrom along a stem axis to a distal end of the stem, wherein the end of the airfoil is wider than the hole and abuts the first side of the platform, and the stem extends through and beyond the hole;
- a non-threaded contact surface on the distal end of the stem; and
- a ring element around the stem, the ring element comprising a proximal end that abuts the second side of the platform and a distal surface that exerts a radially inward clamping force, relative to the stem axis, against the non-threaded contact surface of the stem;
- wherein the distal surface of the ring element engages the non-threaded contact surface at an angle of contact that converts the radially inward clamping force into an axial tension in the stem that draws the end of the airfoil against first side of the platform; and
- wherein the ring element comprises a compression ring made of sintered powdered metal.

11. The mechanism of claim 10, wherein the non-threaded contact surface of the stem is a distal surface of a groove in a lateral surface of the stem; the ring element comprises a split collet disposed partly in the groove and a compression ring surrounding the split collet; and wherein the distal surface of the ring element is formed on the spit collet.

12. A method for joining first and second parts comprising:
- forming a first part comprising a hole passing through a thickness thereof between a first side and a second side thereof;
- forming a second part comprising a stem extending along an axis from a shoulder on the second part to a distal end of the stem, wherein the shoulder is wider than the hole and the stem is longer than the thickness of the first part;
- forming a non-threaded contact surface on the stem;
- inserting the stem through the hole in the first part, with the shoulder abutting the first side of the first part;
- forming a ring element comprising a proximal end and a distal surface;
- disposing the ring element around the stem with the proximal end of the ring element abutting the second side the of first part and the distal surface of the ring element adjacent the non-threaded contact surface of the stem; and
- shrinking the ring element relative to the stem;
- wherein the distal surface of the ring element exerts a radially inward clamping force against the non-threaded contact surface of the stem at an angle of contact therebetween that converts the radially inward clamping force into an axial tension in the stem that draws the shoulder of the second part against first side of the first part;
- forming the second part and the stem of a first sinterable material;
- sintering the second part and the stem;
- forming the ring element of the first sinterable material or a second sinterable material;
- processing the ring element to a first rigid state comprising a green or partly fired ceramic or a compacted metal powder;
- disposing the ring element around the sintered stem; and
- sintering the ring element to shrink it relative to the stem.

13. A method for joining first and second parts comprising:
- forming a first part comprising a hole passing through a thickness thereof between a first side and a second side thereof;
- forming a second part comprising a stem extending a on an axis from a shoulder on the second to a distal end of the stem wherein the shoulder is wider than the hole and the stem is longer than the thickness of the first part;
- forming a non-threaded contact surface on the stem;

inserting the stem through the hole in the first part, with the shoulder abutting the first side of the first part;

forming a ring element comprising a proximal end and a distal surface;

disposing the ring element around the stem with the proximal end of the element abutting the second side the of first part and the surface of the ring element adjacent the non-threaded contact surface of the stem; and shrinking the ring element relative to the stem;

wherein the distal surface of the ring element exerts a radially inward clamping force against the non-threaded contact surface of the stem at an angle of contact therebetween that converts the radially inward clamping force into an axial tension in the stem that draws the shoulder of the second part against first side of the first part; and forming a groove in a lateral surface of the stem, wherein the non-threaded contact surface of the stem comprises a distal side surface of the groove with a surface angle of 10-80 degrees relative to the stem axis in a plane of the stem axis.

14. The method of claim 13, comprising:

filling a bottom portion of the groove with a layer of a fugitive material;

forming the ring element by disposing a sinterable material in the groove, using the groove as a form; and sintering the ring element with heat that shrinks it and removes the fugitive material, causing radially inward shrinkage of the ring element.

* * * * *